United States Patent [19] [11] 3,979,310
Montiglio et al. [45] Sept. 7, 1976

[54] PROCESS FOR PREPARING FERROMAGNETIC CHROMIUM DIOXIDE

[75] Inventors: Ugo Montiglio; Giampiero Basile; Pierfrancesco Aspes; Elio Gallinotti, all of Alessandria, Italy

[73] Assignee: Montedison S.p.A., Milan, Italy

[22] Filed: Apr. 29, 1975

[21] Appl. No.: 572,655

[30] Foreign Application Priority Data
May 9, 1974    Italy .................................. 22489/74

[52] U.S. Cl. ............................ 252/62.51; 423/607; 252/62.55; 252/62.56
[51] Int. Cl.² ....................................... C01G 37/02
[58] Field of Search .......... 252/62.51, 62.55, 62.56; 423/607

[56]    References Cited
UNITED STATES PATENTS

| 2,923,683 | 2/1960 | Ingraham et al. ............... 252/62.51 |
| 3,034,988 | 5/1962 | Ingraham et al. ............... 252/62.51 |
| 3,874,923 | 4/1975 | Montiglio et al. ........... 252/62.51 X |

FOREIGN PATENTS OR APPLICATIONS 1,343,623    1/1974    United Kingdom

Primary Examiner—Jack Cooper
Attorney, Agent, or Firm—Hubbell, Cohen, Stiefel & Gross

[57]   ABSTRACT

Ferromagnetic chromium dioxide is prepared by thermally decomposing, at a temperature of 250°–500°C, and a pressure of at least 80 atmospheres, a mixture of hydrated trivalent chromium chromate of the formula $Cr_2(CrO_4)_3 \cdot nH_2O$, wherein $n$ is 7–12, and antimony or a compound thereof, the amount of antimony in the mixture being between 0.2 and 1.8% by weight based on the weight of anhydrous $Cr_2(CrO_4)_3$. In another embodiment, other known modifiers for chromium dioxide, such as lanthanum, lithium, strontium, iron or lead, or a compound thereof may be added to the mixture of chromium chromate and antimony. The amount of said other modifiers is between 0.1 and 2% by weight of the element, based on the weight of anhydrous $Cr_2(CrO_4)_3$.

12 Claims, No Drawings

PROCESS FOR PREPARING FERROMAGNETIC CHROMIUM DIOXIDE

CROSS REFERENCE TO RELATED APPLICATIONS

This application is related to and incorporates by reference the contents of co-pending application Ser. No. 231,028 filed on Mar. 1, 1972, now U.S. Pat. No. 3,929,978 which application is owned by the unrecorded assignee hereof.

BACKGROUND OF THE INVENTION

1. Field of the Invention

The present invention relates to a process for preparing ferromagnetic chromium dioxide.

2. The Prior Art

Ferromagnetic chromium dioxide products are, of course, known. Such products are used in various aspects of magnetic recording, such as audio and video magnetic recording tapes, tapes and memories for electronic computers, magnetic discs and cards, etc.

In some of these uses, for example, video recording tapes, computer tapes and high fidelity audio recording tapes, it is necessary that the chromium dioxde possess particular magnetic characteristics, that is, a coercive force of at least 300 Oersteds, a magnetization saturation that is as high as possible and a ratio of residual mangetizaton to saturation magnetization of at least 0.4. Moreover the chromium dioxide must consist of elongated particles with as uniform a length as possible.

There are known ferromagnetic chromium dioxides that are obtained by thermally decomposing $CrO_3$ at high temperatures and under high pressures, the $CrO_2$ thereby obtained is a pure product, that is, it is free of other chromium oxides, but it possesses magnetic and granulometric characteristics which are insufficient to permit its use in the above mentioned areas.

Specifically, its coercive force is less than 200 Oersteds and its granulometric characteristics are rather poor. In fact the obtained particles are rather large, non-homogeneous and not very elongated.

A chromium dioxide of smaller and more elongated particle size and characterized by higher values of coercive force is, on the contrary, obtained by heating the chromium anhydride under pressure and in the presence of particular modifying elements or of compounds thereof, such as antimony or tin. In this chromium dioxide, the modifying elements are inserted into the crystalline lattice of the chromium dioxide. However, in such products it is difficult to balance the necessity of obtaining high coercive forces with the necessity of getting high values of magnetization and thus, the product is unsuitable for applications where both high coercive force and a high magnetization value are required.

Copending application Ser. No. 231,028, filed Mar. 1, 1972 and owned by unrecorded assignee hereof, describes a process for the preparation of chromium dioxide starting from a hydrated trivalent chromium chromate of the formula:

$$Cr_2(CrO_4)_3 \cdot nH_2O$$

wherein $n$ varies from 1 to 8. The chromium chromate hydrate is decomposed into $CrO_2$ at temperatures between 250° and 500°C. and under pressures between 30 and 1,000 atm.

The product thereby obtained has good magnetic and granulometric characteristics. The maximum coercive force of that product is about 350 Oersteds, while the particles are elongated and of very uniform dimensions. The best results according to that process are obtained when $n$ is between 2 and 4. When $n$ is greater than 4, the magnetic properties tend to become less good as the value of $n$ rises. When $n$ is greater than 8, the obtained product is in general impure due to the presence of CrOOH, which forms as a separate phase or coats the $CrO_2$ particles thereby reducing both the residual magnetization and the saturation magnetization.

U.S. Pat. No. 3,874,923, relates to ferromagnetic compositions based on $CrO_2$ modified with lanthanum, yttrium, barium or strontium. The addition of these modifiers, in elemental form or in the form of compounds thereof allows one to obtain, when using the same process as described in copending application Ser. No. 231,028 products with an even greater coercive force, (i.e., up to about 440 Oersteds). In this process as well, the optimum value of $n$ in the formula $Cr_2(CrO_4)_3 \cdot nH_2O$ is between 2 and 4. When $n$ is greater than 8, the product is generally impure due to the presence of CrOOH.

The products obtained according to U.S. Pat. No. 3,874,923, particularly when lanthanum is used as the modifier, are very well suited for use in high fidelity audio tapes and in video tapes employed in coventional equipment. However, in the case of video tapes used in equipment requiring particularly high performance (for example in "helical scan" recordings) even higher coercive forces of around 500 Oersteds and more are desirable. Materials having this property are provided by the present invention.

SUMMARY OF THE INVENTION

It is an object of the present invention to provide a new process for preparing ferromagnetic $CrO_2$ having a high coercive force, which if desired, may be equal to or greater than 500 Oersteds, without simultaneously depressing to any appreciable extent either the saturation magnetization or the residual magnetization of the product.

According to the process of this invention, ferromagnetic chromium dioxide is produced by thermally decomposing hydrated trivalent chromium chromate under high pressure, by proceeding as follows:

A mixture of $Cr_2(CrO_4)_3 \cdot nH_2O$, wherein $n$ is between 7 and 12, and antimony or a compound thereof is prepared in such a proportion that the antimony is present in an amount between 0.2 and 1.8% by weight based on the weight of the anhydrous chromium chromate. The mixture is then heated to a temperature between 250° and 500°C., preferably, 320°–400°C., and under a pressure of at least 80 atm., preferably 80–1000 and most preferably, 200–500 atm.

It has been found, according to the invention, that by using antimony as a modifier it is necessary, in order to obtain a $CrO_2$ of the desired characteristics, to use, as the starting material, a hydrated chromium chromate with a hydration degree different from that which, according to U.S. Pat. No. 3,874,923 and copending application, Ser. No. 231,028, is used for producing unmodified $CrO_2$ or $CrO_2$ modified with lanthanum, yttrium, strontium or barium. According to the above patent and patent application, the degree of hydration must, in fact, be between 1 and 8, preferably between 2 and 4, and it must not in any event exceed 80because in that case products are obtained which, in addition to having very poor magnetic characteristics, are also impure due to the presence of CrOOH. According to the invention, it has been discovered that, in the case of antimony, by using hydration degrees near or above 8, and more precisely, between 7 and 12, not only does CrOOH not form, but moreover, one obtains a $CrO_2$ having particularly good magnetic properties and in particular, coercive forces that may exceed 500 Oersteds, i.e., much higher than those obtained according to the above mentioned patent and patent application.

It has also been found that in order to obtain good results, it is necessary to limit the quantity of added antimony within very strict limits, that is, between 0.2 and 1.8% by weight based on the weight of anhydrous chromium chromate. The very best results, in terms of the highest coercive forces are obtained with surprisingly low quantities of antimony, that is, between about 0.3 and 0.7% by weight, based on the weight of anhydrous chromium chromate.

The antimony may be added in the form of the element, per se, an oxide thereof, or in the form of various trivalent or pentavalent antimony salts such as the chlorides, sulphides, nitrates or sulphates; antimonic acid, sodium and potassium antimonites and antimonates.

It has, however, been observed that when antimony salts are added, the anion of the salt may exert an influence on the characteristics of the obtained product which while modest, may nevertheless be undesirable.

Preferably the antimony is added in the form of $Sb_2O_3$ or $Sb_2O_5$.

Regardless of which antimony compound is used, the quantity of such compound added is calculated so as to provide in the reaction mixture, between 0.2 and 1.8% by weight of elemental antimony with respect to the weight of anhydrous chromium chromate. The products with the best magnetic and granulometric characteristics are obtained when the quantity of antimony is between about 0.3 and about 0.7% by weight.

When operating with from about 0.3–0.7% by weight of antimony, the obtained products have a coercive force equal to or greater than 500 Oersteds, and at the same time have excellent saturation magnetization values ($\sigma_s$) usually equal to or greater than 85 electromagnetic units/g. (e.m.u./g.) and a ratio of residual magnetization ($\sigma_r$) to saturation magnetization ($\sigma_s$) i.e. ($\sigma r/\sigma s$), usually equal to or greater than 0.5.

Those products obtained starting from mixtures containing from 0.2 to 0.3% and from 0.7 to 1.8% by weight of antimony, also have excellent magnetic and granulometric properties which make them useful in those applications for which particularly high coercive forces are not required.

The degree of hydration of the chromium chromate, that is, the number of moles of $H_2O$ per mole of $Cr_2(CrO_4)_3$ may be any value between 7 and 12 which corresponds to between 21.7 and 32.3% by weight of $H_2O$, calculated with respect to the weight of anhydrous chromium chromate.

Since the hydrated chromium chromate is obtained by evaporating an aqueous solution of trivalent chromium chromate to form a paste and then drying the paste until reaching a preselected degree of residual hydration, the number of moles of $H_2O$ per mole of $Cr_2(CrO_4)_3$ in the dry mass is obviously an average value which may or may not correspond to a whole number. Thus, the definition of $n$ as being between 7 and 12, is intended to mean the whole numbers 7, 8, 9, 10, 11 and 12 as well as any intermediate value between any two consecutive whole numbers from 7 to 12.

Usually it is preferred to use a degree of hydration between 8 and 12. Particularly satisfactory results are obtained when the degree of hydration is between 9 and 12. It is in this latter range that products with the highest coercive forces are obtained.

The temperature at which the starting mixture is heated, is between 250° and 500°C., preferably, between 320° and 400°C.

The duration of the preliminary heating for the purpose of bringing the starting mixture up to the above indicated reaction temperatues is not critical, nor is the duration of the cooling off of the $CrO_2$ at the end of the reaction. The duration of both these operations is thus adjusted depending on the characteristics of the available equipment.

The minimum period of heating of the starting mixture at the reaction temperature which is necessary to complete the reaction decreases as the temperature increases. Lengthening of the heating period beyond the minimum does not, however, cause any problems. Generally, the reaction mixture is heated at the given reaction temperature for between 0.5 and 2 hours.

The pressure at which the reaction is conducted, as set forth above, is intended to mean the pressure that exists in the reaction environment at the end of the reaction. In considering this aspect of the process, it should be borne in mind that the decomposition of the chromium chromate to $CrO_2$ occurs with the evolution of $O_2$ which, in the absence of a venting device increases the pressure in the autoclave in which the reaction is preferably carried out.

These final reaction pressures, according to the invention, are in general, between 80 and 1,000 atm. Pressures above 1,000 atm. allow one to obtain just as good results, although the use of such high pressures is economically unwarranted. It is preferred to conduct the reaction at pressures between 200 and 500 atm.

When the autoclave in which the reaction is conducted is pressurized before heating, then in order to attain under heating the desired end pressure, one must take into account, not only the thermal expansion of the pressurized gas but also the $O_2$ that is evolved in the reaction, which $O_2$ will by itself create a pressure.

Account must also be taken of the pressure which forms in the autoclave due to the evaporation, under heating of the water in the reaction mixture derived from the water of hydration of the chromium chromate.

Pressurization of the autoclave before heating may be effected with a gas, for example, oxygen, air or nitrogen.

If desired, it is possible to introduce water into the hollow space between the test tube containing the reaction mixture and the autoclave walls. In this way the water pressure derives prevailingly from the evaporation of the thus added $H_2O$ instead of from the water of hydration of the chromium chromate.

The addition of water into the hollow space as thus described does not alter the course of the reaction nor does it alter the results which are obtained.

According to a further, and preferred embodiment of the invention, there may be introduced into the starting mixture, in addition to antimony, one or more elements (or their compounds) known in the art as modifying elements for chromium dioxide such as, for example, the alkali metals, particularly lithium, sodium and potassium, the alkaline earth metals, particularly strontium and barium, and various other elements such as, for example, lanthanum, yttrium, iron, lead, copper, zinc, titanium and aluminum.

The preferred amount of these other modifiers is 0.1–2% by weight of the element, based on the weight of the anhydrous $Cr_2(CrO_4)_3$; the most preferred amount being 0.3–1% by weight. The use of these other modifiers is particularly preferred when it is desired to attain coercive forces of a particularly high value. In order to achieve this end, i.e., very high coercive forces, it is particularly preferred to use lanthanum, iron, or strontium as the additional modifier. In fact, when one or more of lanthanum, iron or strontium is used in combination with antimony, it is possible to obtain coercive forces definitely exceeding 500 Oersteds, and which in certain instances may even reach 600 Oersteds.

The hydrated trivalent chromium chromate which is used as the starting material according to the invention, is a saline compound, which may be obtained according to simple chemical reactions, long known and described in the technical literature, for example, Gmelins Handbuch der anorganischen Chemie, Verlag Chemie (1962), 8th edition Auflage-Chrom, Teil B, pages 104–105.

It is soluble in water and is amorphous to X-rays. Infrared spectroscopy shows a wide absorption band which begins at 9.5 microns, attains a maximum at 10.5 microns and extends up to 15 microns.

A convenient method for obtaining this material is by reducing $CrO_3$ in aqueous solution with methyl alcohol in a stoichiometric quantity, according to the reaction:

$$5\ CrO_3 + CH_3OH \rightarrow Cr_2(CrO_4)_3 + 2H_2O + CO_2.$$

The resulting solution is then evaporated and the thus obtained paste is dried, for example, at 110°–160°C. under vacuum until the desired degree of hydration is achieved.

The antimony and the other optional modifying elements may be mixed together with the chromium chromate using common mixing techniques. For example, the hydrated chromium chromate may be ground in an agate mortar together with the modifiers. It has been found to be particularly advantageous to add the modifiers to the aqueous solution of chromium chromate, under stirring, before obtaining the solid chromium chromate from the solution. This procedure enables one to obtain products having higher coercive forces.

A description of apparatus suitable for carrying out the reaction according to the invention follows.

The apparatus comprises an autoclave, made of stainless steel or some other suitable material, provided with a valve which, when desired, allows one to discharge the oxygen that forms during the reaction, whereby the pressure may be kept at a constant value if and when desired; a second valve for creating a preselected initial pressure by means of an external source of gas before starting the reaction; and a pressure gauge for measuring the pressure.

A thermocouple which is inserted into the reaction mass permits the course of the internal temperature in relation to the time to be followed and recorded on a recording device.

The autoclave is heated in a muffle furnace of suitable size, a chamber with forced hot-gas circulation, or other heating means.

The determination of the characteristics of the obtained products is carried out:

by means of an X-ray diffractometer, since the $CrO_2$, as is known, has a characteristic diffraction spectrum;

by means of an electron microscope, for example, at 50,000 enlargements which enables one to define the dimensions, shape and granulometric distribution of the obtained particles;

by evaluating the following magnetic characteristics: saturation magnetization ($\sigma_s$) and residual magnetization ($\sigma_r$) expressed in electromagnetic units/g. (e.m.u./g.); and intrinsic coercive force (Hci), expressed in Oersteds.

The products obtained according to the invention have the same X-ray diffraction diagram as unmodified $CrO_2$.

The products consist of acicular particles prevailingly or totally having a single magnetic domain. The average length of the particles in general is between 0.15 and 0.5 micron; the mean axial ratio (i.e., the mean ratio of length/width) of the particles is generally between 5:1 and 10:1.

The coercive force of the products can be varied by varying the degree of hydration of the chromium chromate and the quantity of antimony as well as the other optional modifiers, and it may exceed, if desired, 500 Oersteds.

The saturation magnetization is in general greater than 75 e.m.u./g. and may reach 90 e.m.u./g. or more. The ratio $\sigma_r/\sigma_s$ is generally greater than 0.4 and may reach and exceed 0.6.

The main advantages of this invention are:

It is possible to obtain products with a very high coercive force and, when desired, coercive forces that equal and even exceed 500 Oersteds.

These results may be attained with very small quantities of the modifier, as a result of which the saturation and residual magnetization of the product are not appreciably reduced in comparison with that of the unmodified $CrO_2$.

The process is simple and economical. In comparison with the method of preparation of pure $CrO_2$ or $CrO_2$ modified with La, Y, Sr or Ba, disclosed in application Ser. No. 231,028 and U.S. Pat. No. 3,874,923, one obtains a further considerable advantage: the chromium chromate must only be dehydrated to a degree of hydration of about 10 (i.e., to a water content of about 28.5% by weight) instead of about 3 (i.e., to a water content of about 10.67%). The dehydration operation is thus considerably simplified.

DESCRIPTION OF THE PREFERRED EMBODIMENT

The following examples are given in order to further illustrate the invention without, however, limiting same.

EXAMPLE 1

The trivalent chromium chromate used as the starting material in this example was prepared in the following manner:

2,000 g. of $CrO_3$ were dissolved in distilled water thereby obtaining 4 liters of solution. The solution was then placed in a four-necked 10 liter flask fitted with a stirrer, a reflux condenser and a thermometer, after which 128 g. of $CH_3OH$ were added dropwise and the solution was brought to boiling, which was continued for about 15 hours until complete reaction of the methyl alcohol occurred whereby the methyl alcohol was converted into $CO_2$. From the flask there was then withdrawn a 10 cc sample of the solution. The $Cr^{6+}/Cr^{3+}$ ratio of the sample was then determined by means of an iodometric titration of the hexavalent chromium and by determination of the total chromium after oxidation with $Na_2O_2$.

The thus determined ratio was found to be 1.5. Moreover, the concentration of anhydrous chromium chromate in the solution was also determined and found to be 478 g/l of $Cr_2(CrO_4)_3$.

104.6 cc of the solution, which contained 50 g. of anhydrous $Cr_2(CrO_4)_3$ were then placed into a glass vessel. While vigorously stirring the solution, 0.178 g. of $Sb_2O_3$ (equivalent to 0.3% by weight of Sb based on the anhydrous chromium chromate) was added thereto. The vessel which was continuously stirred was then heated in a water bath to evaporate the excess water and obtain a sufficiently thick paste which was then dried in an oven under vacuum at 160°C. to obtain trivalent chromium chromate in the solid state and having a degree of hydration of 10 moles of $H_2O$.

After thoroughly grinding this material in an agate mortar, it was placed into a 130 ml. titanium test tube which was then placed in an autoclave of the above described type, made of stainless steel and having a holding capacity of 200 ml.

Into the hollow space between the test tube and the walls of the autoclave there were placed 10 cc of distilled water. The autoclave was then heated in a muffle oven set to a temperature of 380°C. At the beginning of the autoclaving, an internal pressure of 105 atm. of oxygen was established by means of oxygen supplied from an oxygen bottle. The pressure within the autoclave rose during the heating as a result of (1) the oxygen that was forming during the heating, (2) the water that evaporated and (3) the thermal expansion of the gases within the autoclave. After 3 hours the temperature inside the autoclave reached 375°C., a value which was maintained for 120 minutes. The final pressure amounted to 350 atm.

After cooling the autoclave, the pressure was released and the autoclave was opened. It was found that in the container there had formed a black powder which was ground in a ball mill, then washed with water until the wash water became clear, and finally dried in an oven.

An X-ray diffractogram of the obtained product indicated that it consisted of $CrO_2$. Its Sb content as determined by X-ray fluorescence, amounted to 0.29% by weight.

The coercive force of the product was determined with an alternate current hysterisigraph operating with a field of about 1,000 Oersteds and was found to be 440 Oersteds.

The saturation magnetization and the residual magnetization of the product were determined by means of a Foner type vibrating sample magnetometer capable of supplying a maximum field of 18,000 Oersteds. The $\sigma_s$ amounted to 88.0 e.m.u./g., while the ratio $\sigma_r/\sigma_s$ was 0.51.

The mean ratio length/width of the particles was 8:1, and their mean length was 0.2 micron. 90% of the particles had a length between 0.08 and 0.4$\mu$.

EXAMPLES 2–8

The procedure of Example 1 was repeated in the following examples, with varying amounts of $Sb_2O_3$ being introduced into the chromium chromate solution, whereby to obtain, in the starting mixture, different values of percent by weight of antimony with respect to the anhydrous chromium chromate.

With the exception of Example 3, no distilled water was introduced into the hollow space between the test tube and the autoclave walls.

The results obtained in these Examples are recorded in Table 1.

TABLE 1

| Example | Number of moles of water of hydration | % by weight of antimony in the starting mixture | Hci | $\sigma_s$ | $\sigma_r/\sigma_s$ |
|---|---|---|---|---|---|
| 2 | 10 | 0.2 | 320 | 88.4 | 0.42 |
| 3 | 10 | 0.4 | 530 | 88.2 | 0.56 |
| 4 | 10 | 0.5 | 500 | 87.6 | 0.53 |
| 5 | 10 | 0.6 | 470 | 87.1 | 0.52 |
| 6 | 10 | 0.7 | 450 | 87.2 | 0.49 |
| 7 | 10 | 1.0 | 400 | 85.3 | 0.47 |
| 8 | 10 | 1.6 | 340 | 83.6 | 0.41 |

The product obtained in Example 4 contained 0.51% by weight of Sb and had the following granulometric characteristics:

| | |
|---|---|
| Mean axial ratio | 10:1 |
| Average length | 0.4$\mu$ |
| Length of 90% of the particles | between 0.1 and 0.6$\mu$ |

The product obtained in Example 7 contained 0.93% by weight of Sb and had the following granulometric characteristics:

| | |
|---|---|
| Mean axial ratio | 7:1 |
| Average length | 0.17$\mu$ |
| Length of 90% of the particles | between 0.08 and 0.3$\mu$ |

EXAMPLES 9–14

The procedures followed in these Examples were the same as in Example 1, except for the following differences:

a. The amount of $Sb_2O_3$ introduced into the chromium chromate solution was 0.299 g. in Examples 9, 10, 11 and 12 and thus, the percent by weight of antimony amounted to 0.5 based on the anhydrous chromium chromate.

b. In examples 13 and 14, the percent by weight of antimony was 0.4 and 0.65, respectively.

c. The drying of the product in the oven was continued until the degree of hydration of the hydrated chromium chromate set forth in Table 2 was reached.

d. No distilled water was introduced into the hollow space between the test tube and the autoclave walls.

The results obtained in Examples 9–14 are recorded in Table 2.

TABLE 2

| Example | Number of moles of water of hydration | % by weight of antimony in the starting mixture | Hci | $\sigma_s$ | $\sigma_r/\sigma_s$ |
|---|---|---|---|---|---|
| 9 | 7 | 0.5 | 405 | 87.4 | 0.46 |
| 10 | 8 | 0.5 | 450 | 87.9 | 0.51 |
| 11* | 10 | 0.5 | 500 | 87.6 | 0.53 |
| 12 | 12 | 0.5 | 495 | 88.1 | 0.51 |
| 13 | 9 | 0.4 | 440 | 87.1 | 0.47 |
| 14 | 11 | 0.65 | 455 | 87.5 | 0.51 |

*Example 11 is the same as Example 4 (Table 1).

The product obtained in Example 10 contained 0.49% by weight of Sb and had the following granulometric characteristics:

| | |
|---|---|
| Mean axial ratio | 8:1 |
| Average length | $0.25\mu$ |
| Length of 90% of particles | between 0.1 and 0.6$\mu$ |

EXAMPLE 15

The procedure followed in this Example was the same as in Example 1 except that the amount of $Sb_2O_3$ introduced into the chromium chromate solution was 0.239 g., and thus the percent by weight of antimony amounted to 0.4% with respect to the anhydrous chromium chromate.

No distilled water was introduced into the hollow space between the test tube and the autoclave walls. The autoclave itself was heated in a muffle oven thermostabilized at 350°C. At the beginning of the Example, an internal pressure of 46 atm. of oxygen was established.

After 3 hours, the temperature inside the autoclave was 340°C. and that temperature was maintained for 120 minutes. The final pressure amounted to 250 atm.

The magnetic characteristics of the obtained product were as follows: Hci = 480 Oersteds; $\sigma_s$ = 79.1 e.m.u./g.; $\sigma_r/\sigma_s$ = 0.55.

EXAMPLE 16

The procedure followed in this Example was the same as in Example 1, except that the amount of $Sb_2O_3$ introduced into the chromium chromate solution was 0.239 g., and thus the percent by weight of antimony amounted to 0.4% with respect to the anhydrous chromium chromate.

In the hollow space between the test tube and the autoclave walls no distilled water was introduced. The autoclave was heated in a muffle oven thermostabilized at a temperature of 380°C. At the beginning of the Example, an internal pressure of 85 atm. was established by means of nitrogen added from a nitrogen bottle.

After 3 hours, the temperature inside the autoclave reached 375°C., and was maintained thereat for 120 minutes. The final pressure amounted to 350 atm.

The magnetic characteristics of the obtained product were: Hci = 490 Oersted; $\sigma_s$ = 87.3 e.m.u./g.; $\sigma_r/\sigma_s$ = 0.54.

The following Examples are given to show the preparation of $CrO_2$ modified by the inclusion of a second element in addition to Sb. In Examples 17–24, this second element is La; in Examples 25–28, this second element is respectively Li, Sr, Fe and Pb.

EXAMPLES 17–24

The procedures followed in these Examples were the same as in Example 1, except that, before introducing the $Sb_2O_3$ into the chromium chromate solution in varying quantities, there was also introduced into this same solution, varying quantities of $La_2O_3$.

In Examples 23 and 24 the number of moles of water of hydration of the chromium chromate was different than in Example 1.

The results obtained are set forth in Table 3, in which the percentages by weight of lanthanum are expressed in terms of elemental lanthanum and are calculated by weight with respect to the anhydrous chromium chromate.

TABLE 3

| Example | Number of moles of water of hydration | % by weight of antimony | % by weight of lanthanum | Hci | $\sigma_s$ | $\sigma_r/\sigma_s$ |
|---|---|---|---|---|---|---|
| 17 | 10 | 0.3 | 0.3 | 480 | 87.6 | 0.51 |
| 18 | 10 | 0.4 | 0.4 | 550 | 87.1 | 0.55 |
| 19 | 10 | 0.5 | 0.5 | 530 | 87.2 | 0.55 |
| 20 | 10 | 0.6 | 0.6 | 495 | 87.0 | 0.52 |
| 21 | 10 | 0.7 | 0.7 | 465 | 86.5 | 0.49 |
| 22 | 10 | 1.0 | 1.0 | 410 | 85.3 | 0.48 |
| 23 | 8 | 0.5 | 0.5 | 470 | 86.7 | 0.50 |
| 24 | 12 | 0.5 | 0.5 | 525 | 87.0 | 0.54 |

EXAMPLES 25–28

The procedures followed in these Examples were the same as in Example 1, except for the following variations:

a. $Sb_2O_3$ was introduced in a quantity corresponding to 0.5% by weight of antimony.

b. The Li, Sr, Fe and Pb compounds were introduced in quantities corresponding to 0.5% by weight of the corresponding elements, based on the anhydrous chromium chromate.

c. No distilled water was introduced into the hollow space between the test tube and the autoclave walls.

d. In each Example, the compound of the second element, i.e., Li, Sr, Fe, or Pb, was added to the chromium chromate solution before adding the $Sb_2O_3$.

e. In Examples 25 and 26, the respective lithium and strontium carbonates were introduced in the solid state.

f. In Example 27, the hydrated $Fe(OH)_3$ was prepared by precipitation of ferric hydrate from an $FeCl_3$ solution with an excess of ammonia. The precipitate was filtered and washed until complete disappearance of $Cl^-$ ions.

g. In Example 28, the hydrated $Pb(OH)_2$ was prepared by precipitation of lead hydrate at the boiling point from a solution of $Pb(CH_3COO)_2$ with excess ammonia, with the precipitate being filtered and thoroughly washed.

The results of these Examples are set forth in Table 4.

TABLE 4

| Example | Number of moles of water of hydration | % by weight of antimony | Nature of the compound of the second element | % by weight of the second element | Hci | $\sigma_s$ | $\sigma_r/\sigma_s$ |
|---------|---------------------------------------|-------------------------|---------------------------------------------|-----------------------------------|-----|-----------|---------------------|
| 25 | 10 | 0.5 | $Li_2CO_3$ | 0.5 | 485 | 87.5 | 0.46 |
| 26 | 10 | 0.5 | $SrCO_3$ | 0.5 | 530 | 85.2 | 0.53 |
| 27 | 10 | 0.5 | $Fe(OH)_3$, hydrated | 0.5 | 585 | 84.1 | 0.58 |
| 28 | 10 | 0.5 | $Pb(OH)_2$, hydrated | 0.5 | 505 | 84.3 | 0.51 |

Variations can, of course, be made without departing from the spirit and scope of the invention.

Having thus described our invention, what we desire to secure by Letters Patent and hereby claim is:

1. A process for producing ferromagnetic chromium dioxide by thermally decomposing hydrated trivalent chromium chromate, said process comprising preparing a mixture of $Cr_2(CrO_4)_3 \cdot nH_2O$ wherein n is between 8 and 12 and antimony or a compound thereof and wherein the antimony is present in the mixture in an amount corresponding to 0.2 to 1.8% by weight based on the weight of anhydrous $Cr_2(CrO_4)_3$ and heating the mixture to a temperature of 250°–500°C. at a pressure of at least 80 atmospheres.

2. A process according to claim 1, wherein the amount of antimony is 0.3–0.7% by weight.

3. A process according to claim 1, wherein the temperature is 320°–400°C.

4. A process according to claim 1, wherein the pressure is between 200 and 500 atmospheres.

5. A process according to claim 1, wherein the starting mixture is prepared by adding the antimony or a compound thereof to an aqueous solution of trivalent chromium chromate, evaporating said solution to form a paste and drying the thus obtained paste.

6. A process according to claim 1, wherein the mixture of $Cr_2(CrO_4)_3 \cdot nH_2O$ and antimony or a compound thereof also includes at least one other element selected from the group consisting of alkali metals, alkaline earth metals, lanthanum, yttrium, iron, lead, copper, zinc, titanium and aluminum or a compound thereof.

7. A process according to claim 6, wherein the other element or compound thereof is present in the mixture in an amount corresponding to 0.1–2% by weight of the element based on the weight of the anhydrous $Cr_2(CrO_4)_3$.

8. A process according to claim 7, wherein the other element is selected from the group consisting of lanthanum, iron and strontium.

9. A process according to claim 6, wherein the starting mixture is prepared by adding the antimony or a compound thereof, together with the other element or a compound thereof to an aqueous solution of trivalent chromium chromate, evaporating said solution to form a paste and drying the thus obtained paste.

10. A process according to claim 7, wherein the amount of the other element is 0.3–1.0%.

11. A process according to claim 10, wherein the other element is lanthanum.

12. A process according to claim 10, wherein the other element is iron.

* * * * *

PO-1050
(5/69)

UNITED STATES PATENT OFFICE
CERTIFICATE OF CORRECTION

Patent No. 3,979,310            Dated September 7, 1976

Inventor(s) UGO MONTIGLIO et al

It is certified that error appears in the above-identified patent and that said Letters Patent are hereby corrected as shown below:

Column 2, line 22: "$Cr_2(CrO4)3 \cdot nH_2O$" should read -- $Cr_2(CrO_4)_3 \cdot nH_2O$ --;

line 68: "80because" should read -- 8 because --.

Column 11, line 5 of claim 1: "8 and 12" should read -- 9 and 12 --.

Signed and Sealed this

Twenty-eighth Day of December 1976

[SEAL]

Attest:

RUTH C. MASON
Attesting Officer

C. MARSHALL DANN
Commissioner of Patents and Trademarks